United States Patent
Bertsch-Frank et al.

[11] Patent Number: 5,902,682
[45] Date of Patent: May 11, 1999

[54] COATED SODIUM PERCARBONATE PARTICLES, A PROCESS FOR THEIR PREPARATION AND THEIR USE

[75] Inventors: Birgit Bertsch-Frank, Rheinfelden; Martin Bewersdorf, Gelnhausen; Claas-Juergen Klasen, Freigericht; Thomas Lieser, Hanau; Klaus Mueller, Hasselroth; Juergen Rollmann, Pflaumheim, all of Germany

[73] Assignee: Degussa Aktiengesellschaft, Frankfurt am Main, Germany

[21] Appl. No.: 08/586,597

[22] Filed: Jan. 16, 1996

Related U.S. Application Data

[63] Continuation of application No. PCT/EP94/01271, Apr. 23, 1994.

[30]    Foreign Application Priority Data

Jul. 17, 1993  [DE]   Germany .............................. 43 24 104

[51] Int. Cl.⁶ ................................ B32B 5/16; C11D 9/12
[52] U.S. Cl. .................... 428/403; 252/174.14; 428/404; 428/699; 428/701; 428/702
[58] Field of Search ..................... 428/403, 404, 428/699, 701, 702; 252/174.14

[56]    References Cited

U.S. PATENT DOCUMENTS

| | | | |
|---|---|---|---|
| 3,951,838 | 4/1976 | Jayawant et al. | 252/99 |
| 4,325,933 | 4/1982 | Matsumoto et al. | 423/415 |
| 5,332,518 | 7/1994 | Kuroda et al. | 252/99 |
| 5,340,496 | 8/1994 | Sato et al. | 252/186.27 |
| 5,346,680 | 9/1994 | Roesler et al. | 423/274 |
| 5,366,655 | 11/1994 | Yamashita et al. | 252/186.27 |
| 5,462,804 | 10/1995 | Kokubu et al. | 428/402.24 |
| 5,496,542 | 3/1996 | Hauschild | 424/53 |
| 5,603,911 | 2/1997 | Korvela et al. | 423/266 |

FOREIGN PATENT DOCUMENTS

| | | |
|---|---|---|
| 0405797 | 1/1991 | European Pat. Off. . |
| 0546815 | 6/1993 | European Pat. Off. . |
| 623 553 | 11/1994 | European Pat. Off. . |
| 2226460 | 11/1974 | France . |
| 2424228 | 11/1979 | France . |
| 2417572 | 11/1974 | Germany . |
| 2733935 | 2/1978 | Germany . |
| 2652776 | 5/1978 | Germany . |
| 2651442 | 11/1979 | Germany . |
| 2810379 | 12/1980 | Germany . |
| 3321082 | 12/1983 | Germany . |
| 2622610 | 9/1986 | Germany . |
| 2800916 | 3/1987 | Germany . |
| 174891 | 1/1922 | United Kingdom . |

*Primary Examiner*—H. Thi Le
*Attorney, Agent, or Firm*—Beveridge, DeGrandi, Weilacher & Young, L.L.P.

[57] ABSTRACT

Coated sodium percarbonate particles contain, in the coating, sodium carbonate and also one or more magnesium compounds, preferably magnesium sulfate, optionally in a partially hydrated form, in a single layer or in separate layers in the coating. Preferred coated sodium percarbonate particles contain two layers. Particles are prepared by spraying aqueous solutions containing the coating components onto sodium percarbonate in a fluidized bed with simultaneous evaporation of the water. The particles are suitable for use in detergents, bleaches and cleansing agents.

8 Claims, No Drawings

COATED SODIUM PERCARBONATE PARTICLES, A PROCESS FOR THEIR PREPARATION AND THEIR USE

REFERENCE TO A RELATED APPLICATION

This application is an continuation of PCT/EP94/01271, Apr. 23, 1994 which is relied on and incorporated herein by reference.

INTRODUCTION AND BACKGROUND

The invention relates to coated sodium percarbonate particles consisting of a core of sodium percarbonate and a coating which contains sodium carbonate, which constitutes from 1 to 25 wt. % of the sodium percarbonate. The coated sodium percarbonate particles, which also contain a magnesium compound as a coating component, are characterized by high storage stability in the presence of washing powders in a moist and warm environment. The invention further relates to a process for preparing the coated sodium percarbonate particles by applying a mono or multi-layered coating in a fluidized bed. The invention also relates to the use of the coated sodium percarbonate particles as bleaching components in detergent, cleansing agent and bleaching agent formulations.

Sodium percarbonate ($2Na_2CO_3.3H_2O_2$) is used as an active oxygen component in detergents, bleaches and cleansing agents. Due to the unsatisfactory storage stability of sodium percarbonate in a warm and moist environment and in the presence of various components in detergents and cleansing agents, sodium percarbonate has to be stabilized against the loss of active oxygen ($O_a$). An essential principle for stabilization involves surrounding the sodium percarbonate particles with a coating of stabilizing components.

GB 174 891 has already disclosed spraying active oxygen-containing compounds with a sodium waterglass solution and then drying, in order to increase the storage stability. Sodium percarbonate is also stabilized by applying an adequate amount of silicate to sodium percarbonate particles, obtained by crystallization, in the process in DE-OS 26 52 776. A satisfactory stabilizing effect, especially in the presence of detergents and cleansing agents, is not produced by the previously mentioned methods.

Processes for stabilizing particulate sodium percarbonate are known from DE-OS 24 17 572 and DE-PS 26 22 610, wherein either a mixed compound which is formed by crystallizing a sodium carbonate with other inorganic salts such as sodium bicarbonate and/or sodium sulphate, or a mixture of sodium carbonate, sodium sulfate and a sodium silicate is used as a coating substance. In these processes, an aqueous solution of the constituents for the coating material is sprayed onto sodium percarbonate particles in a fluidized bed while maintaining a fluidized bed temperature of between 30 and 80° C., wherein a solid coating is built up by evaporation of the water which is introduced. Despite the greatly improved stability of sodium percarbonate particles coated in this way, the active oxygen content still decreases too rapidly during long-term storage in the presence of a washing powder.

Numerous methods for the effective stabilization of sodium percarbonate by using boron compounds, such as boric acids (DE-PS 28 00 916), borates (DE-OS 33 21 082) and perborates (DE-PS 26 51 442 and DE-PS 28 10 379) are known. Despite a sometimes very good stabilizing effect, the market is increasingly interested in coated sodium percarbonate which does not contain boron compounds.

Another type of coating component is known from U.S. Pat. No. 4,325,933. According to this, stabilization is achieved by treating the sodium percarbonate with an aqueous solution of an alkaline earth metal salt, either magnesium sulfate or magnesium chloride. When treating the sodium percarbonate particles, a layer made of an alkaline earth carbonate is formed on the surface of the particles, which reduces the hygroscopic character of the sodium percarbonate and increases the stability. However, it has been shown that this type of stabilized product does not possess satisfactory storage stability.

EP-A 0 405 797 discloses sodium percarbonate compositions which are more reliable. According to one embodiment, the composition contains a compound from the group of inorganic magnesium compounds in addition to an alkali metal carbonate. The composition mentioned does not comprise sodium percarbonate particles with a uniform coating which adheres firmly to the sodium percarbonate core, but a mixture of substances which can also be granulated. During the finishing operations in the process given in the document mentioned, it was established that the storage stability of this type of composition, in the presence of a washing powder in a warm and moist environment, is not satisfactory; see comparison examples CE 2 to CE 4.

Accordingly, an object of the invention is to provide new, coated, sodium percarbonate particles with high storage stability in the presence of washing powders, wherein the coating should not contain boron compounds. The storage stability of the new coated sodium percarbonate particles is intended preferably to surpass that which has been obtainable using hitherto known, boron-free, coated sodium percarbonate particles. A further object of the invention relates to the provision of a suitable process for preparing storage-stable, boron-free, coated, sodium percarbonate particles.

SUMMARY OF THE INVENTION

In achieving the above and other objects, one feature of the invention resides in coated sodium percarbonate particles comprising a core of sodium percarbonate and a coating which contains sodium carbonate, and which constitutes from 0.5 to 25 wt % (calculated hydrate-free) of the sodium percarbonate, and which further contains one or more magnesium compounds selected from the group consisting of salts of sulfuric acid, hydrochloric acid and carboxylic acids with 1 to 4 carbon atoms or the reaction products of the salts mentioned with sodium carbonate and/or other optionally present coating components. The coating components may be partially hydrated and sodium carbonate and the one or more magnesium compounds may be located in a single layer or in separate layers of the coating.

Another feature of the invention resides in a process for preparing coated sodium percarbonate particles by applying a coating of solid coating components onto sodium percarbonate particles. The process is carried out by spraying an aqueous solution containing one or more coating components onto the particles to be coated which are located in a fluidized bed and evaporating the water while maintaining a fluidized bed temperature of 30 to 100° C. At least one aqueous solution containing sodium carbonate and at least one aqueous solution containing a magnesium salt from the group Mg sulfate, Mg chloride and a Mg carboxylate of a carboxylic acid with 1 to 4 carbon atoms is sprayed onto the particles to be coated, simultaneously or in any sequence one after the other. The total amount of coating components applied is 0.5 to 25 wt. (calculated hydrate-free), with reference to the sodium percarbonate.

DETAILED DESCRIPTION OF INVENTION

The coated sodium percarbonate particles according to the invention thus consist of a sodium percarbonate core and a mono or multi-layered coating which contains the stabilizing components in a hydrate-free and/or partially hydrated form. The sodium percarbonate core is completely surrounded by the coating which adheres firmly thereto, wherein the thickness of the coating layer is approximately constant over the whole particle.

The amount of coating, calculated as hydrate-free, generally constitutes from 0.5 to 25 wt. % of the sodium percarbonate. Although it is possible to prepare particles with a coating of less then 0.5 wt. % or more than 25 wt. %, the products in the first case possess only moderate storage stability and in the second case have a reduced active oxygen content, corresponding to the increased amount of coating material.

In preferred products, the coating constitutes a total of about 1 to 15 wt. % of the sodium percarbonate, calculated as hydrate-free.

An essential feature of the invention is that the coating contains both sodium carbonate and one or more magnesium compounds, wherein the substances mentioned may be present in an anhydrous and/or in a partially hydrated form. The term "partially hydrated" is to be understood as meaning that the maximum possible water acceptance capacity of the coating components due to hydrate formation has not been exhausted in the coated sodium percarbonate particles according to the invention. In the case of, for example, a coating consisting of $MgSO_4$ and $Na_2CO_3$ in the form of their hydrates the water acceptance capacity is exhausted when $Na_2CO_3$ is present as the monohydrate and $MgSO_4$ is present as the heptahydrate.

The coating contains one or more magnesium compounds selected from the group consisting of magnesium sulfate, magnesium chloride and magnesium salts of a carboxylic acid with 1 to 4 carbon atoms. Hydrates of the compounds mentioned are also included. From the magnesium salts of carboxylic acids, which may contain one or two carboxyl groups and optionally one or two hydroxyl groups, magnesium acetate is preferred. When preparing mono-layered coated sodium percarbonate particles, the coating may also contain reaction products of the previously mentioned salts with sodium carbonate and/or other optionally present coating components such as, for example, sodium silicates; in this way, for example, magnesium carbonate, basic magnesium carbonate, mixed salts of sodium carbonate and magnesium sulfate and, in the case of the presence of sodium silicates, also magnesium silicates, may also arise as constituents of the coating.

Coated sodium percarbonate particles according to the invention may have a mono or multi-layered, preferably two or three-layered, coating. The coating on preferred coated sodium percarbonate particles comprises at least one layer of essentially sodium carbonate and at least one layer of essentially one or more magnesium compounds, in particular magnesium sulfate and hydrates of the same. When building up the at least two-layered structure mentioned for the coating, reactions between the various components in the coating can be restricted to the relevant boundary surfaces of the layers. A two or three-layered coating of the previously mentioned type has an advantageous effect on the storage stability of the coated sodium percarbonate particles.

With a two-layered structure for the coating, the layer which contains sodium carbonate may also contain other stabilizers, but it preferably does not contain magnesium compounds. The supplementary stabilizers should produce a clear solution in the presence of sodium carbonate and also should not display any stability-reducing effect in the solid coating. Active components which can be found in the layer which contains sodium carbonate are alkali metal silicates, especially sodium silicate with a molar ratio of $SiO_2$ to $Na_2O$ in the range 4 to 1 to 1 to 1, preferably in the range 2.5 to 1 to 3.5 to 1. Although in the case of a multi-layered structure for the coating, the layer which contains at least one magnesium compound may also contain other components, among which is also sodium carbonate, it is generally expedient to allocate no compounds other than the magnesium compounds which are being considered to this layer. Preferably, this layer consists of magnesium sulfate and/or some of its hydrates or of magnesium chloride or magnesium acetate and/or some of their hydrates. Magnesium sulfate with a hydrate content between 2 and less than 7 moles of $H_2O$ per mole of $MgSO_4$ is particularly preferred.

In addition to a layer which contains essentially sodium carbonate and a layer which contains essentially at least one magnesium compound, preferred coated sodium percarbonate particles may also possess one or more layers of essentially alkali metal silicates, especially sodium silicates of the previously mentioned composition.

With regard to the stabilizing effect, the sequence of the layered structure in the coating has only a moderate effect. The sequence of layers can have an effect, however, on the flowability of the coated particles. In order to obtain a product which flows particularly well, it may therefore be advantageous to build up the coating so that the external layer consists essentially of sodium carbonate. Coated particles with a layered structure in the sequence, from inside to outside, of magnesium sulfate, sodium carbonate, sodium silicates, wherein these substances may be partially hydrated, exhibit exceptional storage-stability. The storage stability of this type of product exceeds that of products which have only a magnesium sulfate and a sodium carbonate layer with no alkali metal silicate in either layer.

Preferred coated sodium percarbonate particles contain, in one or more coating layers, as stabilizing components, essentially sodium carbonate and/or hydrates of the same in an amount of 0.2 to 10 wt. %, preferably 0.5 to 5 wt. %, calculated as $Na_2CO_3$, one or more magnesium compounds and/or hydrates of the same, especially magnesium sulfate, in an amount of 0.2 to 10 wt. %, preferably 0.5 to 5 wt. %, calculated as $MgSO_4$, and sodium silicates and/or hydrates of the same with a molar ratio of $SiO_2$ to $Na_2O$ of 4 to 1 to 1 to 1 in an amount of 0 to 5 wt. %, preferably 0.2 to 3 wt. % calculated hydrate-free, wherein the amounts given are each with reference to sodium percarbonate.

In addition to the substances mentioned and to the optional reaction products arising therefrom, other stabilizing components may also be contained in one or more of the coating layers in generally smaller amounts, i.e. up to about 2 wt. %, with reference to sodium percarbonate. The additional stabilizing components are in particular typical active oxygen stabilizers such as aminopolycarboxylic acids which form chelate complexes, such as ethylenediamine tetraacetic acid and diethylenetriamine pentaacetic acid; phosphonic acid compounds which form chelate complexes, such as, for instance, 1-hydroxyethane-1,1-diphosphonic acid and ethylenediamine-tetra(methylphosphonic acid) and diethylenetriamine-penta(methylenephosphonic acid) and their salts; water-soluble polymers with carboxyl and hydroxyl groups which are capable of forming complexes, such as, for instance, polymers based on alphahydroxyacrylic acid; stabilizers such as pyridinecarboxylic acids, such as, for instance, dipicolinic acid, may also be present.

Particularly preferred coated sodium percarbonate particles with a core of sodium percarbonate produced by crystallization from aqueous phase, contain, in the coating, sodium carbonate and/or some of its hydrates in an amount of 2 to 6 wt. %, hydrate-free and/or some hydrate-containing magnesium sulfate in an amount of 2 to 6 wt. % hydrate-free and/or some hydrate-containing sodium silicates, with a molar ratio of $SiO_2$ to $Na_2O$ between 3.5 to 1 and 2.5 to 1, in an amount of 0.5 to 3 wt. % and if required one or more of the previously mentioned other stabilizing components in an amount of 0 to 2 wt. %, in particular 0 to 1 wt. %, each with reference to sodium percarbonate and calculated as hydrate-free.

If sodium percarbonate produced by spray granulation is coated, the amount of coating may be reduced as compared with the previously mentioned amounts because in this case the surface of the particles to be coated is smoother than in the case of particles produced by crystallization. To coat sodium percarbonate particles with smooth surfaces, 0.5 to 5 wt. % of $Na_2O_3$, 0.5 to 5 wt. % of $MgSO_4$ and 0.2 to 2 wt. % of sodium silicates ($SiO_2:Na_2O$=2.5 to 3.5 to 1), each with reference to sodium percarbonate, are used.

As can be seen from the examples and comparison examples, the coated sodium percarbonate particles according to the invention are distinguished by unexpectedly high storage stability in the presence of zeolite-containing detergent tower powders as compared with previously known, also boron-free, coated particles. After 8 weeks storage at 30° C. and 80% relative humidity, the relative active oxygen content ($O_a$-retention) of the products according to the invention is approximately 70 to almost 100%, depending on the structure of the layers, the amount of coating and the method of preparation of the sodium percarbonate used. Particularly preferred coated sodium percarbonate particles have an $O_a$-retention of between 93% and about 97% after 8 weeks admixed with a detergent under the storage conditions mentioned.

Among the methods frequently used in the specialist sector for applying a coating layer to products being stabilized are methods using a mixer, wherein the product being stabilized, optionally after moistening the same, is treated with powdered stabilizers, and so-called fluidized bed methods, wherein the coating components, in the form of an aqueous solution, are sprayed onto the product being stabilized which is located in the fluidized bed and the water which is hereby introduced is simultaneously evaporated. It was found that coating sodium percarbonate with coating components according to the invention in a fluidized bed led to a product with an essentially higher storage stability than the previously known coating procedure using a mixer.

The process for preparing coated sodium percarbonate particles according to the invention comprises spraying an aqueous solution which contains one or more coating components onto the particles to be coated, which are located in a fluidized bed, and evaporating the water while maintaining a fluidized bed temperature of 30 to 100° C., and is characterized in that at least one aqueous solution which contains sodium carbonate and at least one aqueous solution which contains a magnesium salt from the group Mg sulfate, Mg chloride and Mg carboxylate of a carboxylic acid with 1 to 4 carbon atoms, are sprayed onto the particles being coated, simultaneously or one after the other in any sequence, wherein the total amount of coating components applied is 1 to 25 wt. % (calculated hydrate free), with respect to the sodium percarbonate.

The solutions containing sodium carbonate and magnesium salt are preferably sprayed on one after the other. It is particularly expedient if a layer which contains sodium carbonate is applied as the outermost layer on the particles. According to another embodiment of the process, an aqueous solution which contains essentially sodium carbonate is initially sprayed onto the particles being coated, then an aqueous solution which contains essentially magnesium sulfate and lastly a solution which again contains essentially sodium carbonate.

According to another embodiment of the process, a solution containing sodium carbonate which also contains alkali metal silicates, preferably sodium silicates, is used. As an alternative to this, one or more coating layers consisting essentially of an alkali metal silicate and/or some of its hydrates may be built up by spraying an aqueous solution of one or more alkali metal silicates, such as for example a sodium waterglass solution, onto the particles being coated, which may already possess one or more coating layers. When using a solution which contains sodium silicates, a molar ratio of $SiO_2$ to $Na_2O$ of 4 to 1 to 1 to 1, preferably 2.5 to 1 to 3.5 to 1, and in particular about 3 to 3.5 to 1, is the basic parameter.

If the coating components sodium carbonate and one or more magnesium compounds are intended to be located in a single coating layer, the sodium carbonate solution and the magnesium salt solution, preferably magnesium sulfate solution, are sprayed onto the particles to be coated from two separate nozzles which are suitably positioned in the fluidized bed or from a three-component nozzle with external mixing. In this embodiment also, the solution containing sodium carbonate may also contain alkali metal silicates. In addition, the solutions may contain other stabilizers which are compatible with sodium carbonate or the magnesium compounds.

The relevant solutions are sprayed onto the particles to be coated in an amount such that the resulting coated particles possess the previously mentioned amounts of coating components in one or more layers. The concentration of coating components in the solutions being sprayed is any at all per se, but the most highly concentrated solutions possible are preferred in order to keep the amount of water to be evaporated as low as possible. Preferably, an approximately saturated sodium carbonate solution and an approximately saturated magnesium salt, in particular magnesium sulfate, solution, are used. Sodium silicates are preferably used in the form of a waterglass solution (35 to 40° Baumé), which contains $SiO_2$ and $Na_2O$ in a molar ratio of about 3.5 to 1.

The technique of applying an aqueous solution which contains one or more coating components to the particles to be coated, that is sodium percarbonate or already partly coated sodium percarbonate, in a fluidized bed is known to a person skilled in the art, reference being made, for example, to DE-PS 26 22 610. In a conventional continuously or batchwise operated fluidized bed device, a fluidized bed is formed from the sodium percarbonate to be coated by using the drying air. The aqueous solutions containing the coating components are sprayed from nozzles, simultaneously or one after the other, wherein the water introduced with the solutions is simultaneously evaporated. The amount of drying air and its temperature are governed both by the amount of water introduced to the fluidized bed with the solutions and by the degree of drying which is desired. The two parameters are matched to each other by the person skilled in the art in such a way that a temperature in the range 30 to 100° C., preferably 50 to 80° C., is maintained in the fluidized bed. Furthermore, it may be expedient that the solutions being sprayed already have a temperature in the range 30 to 80° C. If required, the coated particles may subsequently be dried at 60 to 100° C., in particular at 70 to 90° C., in order to produce satisfactory dehydration of the hydrate-forming coating components.

For the continuous preparation of multi-layered coated sodium percarbonate particles, trough-shaped fluidized bed dryers with two or more spray zones and, if required, an after-drying zone, are preferably used.

The sodium percarbonate particles to be coated may have been produced by any method of preparation of sodium percarbonate at all. Those which may be mentioned in particular are: (i) wet methods, wherein soda and hydrogen peroxide are reacted in an aqueous phase and the resulting sodium percarbonate is separated from the mother liquor; (ii) methods, wherein solid soda is reacted directly with hydrogen peroxide; (iii) so-called spray granulation methods, wherein a soda solution and a hydrogen peroxide solution, or a solution which contains $Na_2CO_3$ and $H_2O_2$, are sprayed onto sodium percarbonate seeds located in a fluidized bed in a fluidized bed dryer with or without a grading outlet, with simultaneous evaporation of the water, until the desired particle size is reached, reference being made, for example, to the method in accordance with DE-OS 27 33 935.

The advantage of the process according to the invention is regarded as being that uniformly coated sodium percarbonate particles with a mono or multi-layered coating which are distinguished by extraordinarily good storage stability, are thereby obtainable. The principle of applying a coating to sodium percarbonate particles and suitable devices for this procedure are known and proven per se in the specialist sector. Performing the process is simple and the amount of coating being applied can be controlled without any problems.

The coated sodium percarbonate particles according to the invention can be used as a bleaching component in detergents, cleansing agents and bleaching compositions. This type of detergent, cleansing agent and bleaching composition is characterized in that the coated sodium percarbonate contained therein has an unexpectedly high storage stability, even in the presence of zeolites, so that there is only a very slow loss of active oxygen during conventional storage times for this type of composition. Detergent, cleansing agent and bleaching compositions which are suitable consist of 1 to 99 wt. % of the coated sodium percarbonate according to the invention and the remaining amount consists of up to 100 wt. % of other conventional components for this type of composition. The following components in particular may be mentioned:

1. Surface active agents from the group of cationic, anionic, non-ionic, amphoteric or ampholytic surface active agents.
2. Inorganic and/or organic builders, whose main action comprises sequestering or complexing the metal ions which are responsible for hardness in the water, for example zeolites, sheet silicates, polyphosphates, aminopolyacetic acids and aminopolyphosphonic acids as well as polyoxycarboxylic acids.
3. Alkaline and inorganic electrolytes such as, for example, alkanolamines and silicates, carbonates and sulfates.
4. Bleach activators from the group of N-acyl compounds and O-acyl compounds, for example tetraacetyl ethylenediamine (TAED).
5. Other constituents in the agents may be stabilizers for peroxides such as in particular magnesium salts, anti-deposition agents, optical brighteners, foam inhibitors, enzymes, disinfectants, corrosion inhibitors, fragrances, dyes and agents for regulating the pH. With regard to individual compounds included in the classes of substances 1 to 5, reference is made, for example, to DE-OS 33 21 082, pages 14–30.

The following examples and comparison examples clearly show the much higher stabilizing effect of the coating according to the invention as compared to similarly structured and similarly prepared previously known, boron-free, coatings on sodium percarbonate.

EXAMPLES a) General description of coating in a mixer, not according to the invention The sodium percarbonate to be coated, which has a moisture content of 5 to 10 wt. % as a result of the method of preparation, is treated with the coating components(s) under continuous mixing in a plough-share mixer. If dry sodium percarbonate is used, this is first brought up to the previously mentioned moisture content by spraying with water or an aqueous solution which contains one or more of the coating components and then mixed with further coating components. Magnesium sulfate was used as the heptahydrate, sodium carbonate as calcined soda; alkali metal silicate was used in the form of a sodium waterglass solution (37°Bé) ($SiO_2$ : $Na_2O$=ca. 3.5 to 1) and sprayed onto dry sodium percarbonate. After completion of the mixing procedure, the coated product is dried at 60 to 70° C. in a fluidized bed dryer until it has a residual moisture content (Karl Fischer) of less than 0.5%.

b) General description of coating in a fluidized bed according to the invention

In a laboratory fluidized bed dryer, the aqueous solutions containing the coating components are sprayed, simultaneously or one after the other, onto the fluidized bed constructed by using the drying air (inlet temperature 100 to 110° C.) and the sodium percarbonate (NaPc) to be coated, wherein the temperature of the fluidized bed is maintained within the range 40 to 60° C. After-drying is performed at 80 to 90° C. The solutions are sprayed by using conventional two-component nozzles with air as the propellant, wherein, to prepare mono-layered coatings according to the invention, the solutions to be used are applied by means of two two-component nozzles, but preferably by means of one three-component nozzle with external mixing.

Aqueous solutions used: $MgSO_4$ solution (30 or 20 wt. % $MgSO_4$); $Na_2CO_3$ solution (30 or 20 wt. % $Na_2CO_3$); sodium silicate solution ca. 37°Bé ($SiO_2$ : $Na_2O_3$ about 3.5:1); combined $Na_2CO_3$/sodium silicate solution (20 wt. % $Na_2CO_3$, 8 wt. % sodium silicate), prepared from a sodium waterglass solution with ca. 37°Bé and a $SiO_2$ to $Na_2O$ molar ratio of about 3.5 to 1. The temperature of the solutions being sprayed is 30 to 40° C.

c) Determination of the storage stability when mixed with a detergent.

Commercially available tower washing powder (Persil Supra SP), which is phosphate-free but contains zeolite, TAED activator and the sodium percarbonate to be tested were mixed in amounts such that the mixture contained 5% TAED and the $O_a$ content was about 2.35 wt. %.

400 g or 800 g (from example 5 and comparison example 10 onwards) of the mixture are stored at 30° C. and 80% relative humidity in a climatic test cabinet in commercially available E1 detergent packets which were impregnated to be water-repellent and glued together. One packet was stored for each period prior to removal, 2, 4 and 8 weeks respectively. The $O_a$ content is determined iodometrically in the usual way. The respective $O_a$-retentions are determined as a %-age, from the initial $O_a$ content and the $O_a$ contents after 2, 4 and 8 weeks.

Examples E 1 to E 4 and Comparison Examples CE 1 to CE 4

Table 1 shows the storage stability when mixed with detergent of the non-coated sodium percarbonate (CE 1) which is used as the starting product for the coated sodium percarbonate particles listed in Table 1, examples E 1 to E 4 and comparison examples CE 2 to CE 4 and for comparison examples CE 5 to CE 9 in Table 3.

Two- and three-layered coating according to the invention took place using the sequence of coating components given in the first column of Table 1. In the case of coating not according to the invention, in a mixer, $MgSO_4 \cdot 7H_2O$ and $Na_2CO_3$ were used simultaneously. The residual moisture content of the NaPc used in CE 2 and CE 3 was ca. 7%. In CE 4, NaPc was initially moistened with a waterglass solution.

The results show that the storage stability of coated sodium percarbonate according to the invention surpassed that of the product coated in a mixer, despite identical amounts of coating.

Table 2 shows the active oxygen content ($O_a$ content) of sodium percarbonate coated in a mixer and in a fluidized bed, immediately after preparation and after 10 weeks storage (without mixing with a detergent). Coated sodium percarbonate according to the invention was characterized in that the $O_a$ content decreased to an essentially smaller extent during storage.

TABLE 1

Storage stability of NaPc*, coated and not coated, when mixed with detergents

| | Comparison examples | | | | Examples (invention) | | | |
|---|---|---|---|---|---|---|---|---|
| Amount (wt. %), w.r.t. NaPc, and type of coating component | CE No. | $O_a$ retention (%) after no. of weeks | | | E No. | $O_a$ retention (%) after no. of weeks | | |
| | | 2 | 4 | 8 | | 2 | 4 | 8 |
| NaPc not coated (starting product for CE 2 to CE 4 and E 1 to E 4) | 1 | 75 | 57 | 34 | | | | |
| NaPc coated | | coated in a mixer | | | | coated in a fluidised bed | | |
| 2.5% $MgSO_4$ 2.5% $Na_2CO_3$ | 2 | 84 | 78 | 46 | 1 | 91 | 86 | 61 |
| 5.0% $MgSO_4$ 5.0% $Na_2CO_3$ | 3 | 84 | 80 | 55 | 2 | 96 | 88 | 71 |
| 2.5% $MgSO_4$ 2.5% $Na_2CO_3$ 1.0% NaWgl** | | | | | 3 | 97 | 86 | 70 |
| 5.0% $MgSO_4$ 5.0% $Na_2CO_3$ 2.0% NaWgl | 4 | 85 | 75 | 58 | 4 | 99 | 91 | 76 |

*NaPc = sodium percarbonate: an NaPc obtained by crystallisation was used
**NaWgl = sodium waterglass ($SiO_2$:$Na_2O$ = 3.5:1)

TABLE 2

$O_a$ content (wt. %) of NaPc as a function of the method of coating (10 weeks storage of NaPc in a plastic bottle)

| | Coated in a mixer | | | Coated in a fluidised bed | | |
|---|---|---|---|---|---|---|
| Coating Amount/substance | CE No. | $O_a$ (%) start | $O_a$ (%) stored | E No. | $O_a$ (%) start | $O_a$ (%) stored |
| 2.5% $MgSO_4$ 2.5% $Na_2CO_3$ | 2 | 13.58 | 10.13 | 1 | 13.44 | 13.29 |
| 5.0% $MgSO_4$ 5.0% $Na_2CO_3$ 2.0% NaWgl | 4 | 12.69 | 11.16 | 4 | 12.24 | 11.97 |

Comparison Examples CE 5 to CE 9

Sodium percarbonate according to CE 1 was coated in the fluidized bed with the previously known substances and previously known combinations of substances given in Table 3. The storage stability when mixed with a detergent was unsatisfactory, which is particularly clear after 8 weeks storage.

TABLE 3

Storage stability of NaPc, coated in a fluidised bed, when mixed with detergent (comparison examples)

| Amount (wt. %) wrt NaPc, and type of coating component | CE No. | $O_a$ retention (%), after no. of weeks | | |
|---|---|---|---|---|
| | | 2 | 4 | 8 |
| NaPc not coated (starting product for CE 5 to CE 9) | 1 | 75 | 57 | 34 |
| 5.0% $Na_2CO_3$ | 5 | 83 | 63 | 39 |
| 2.5% $Na_2CO_3$* 2.5% $Na_2SO_4$ | 6 | 88 | 74 | 46 |
| 2.5% $Na_2CO_3$ 2.5% $Na_2SO_4$* 1.0% NaWgl | 7 | 82 | 72 | 40 |
| 5.0% NaWgl** | 8 | 79 | 58 | 31 |
| 5.0% $MgSO_4$ | 9 | 89 | 74 | 51 |

*The coating components were dissolved in a single solution
**NaWgl = sodium water glass ($SiO_2$:$Na_2O$ = 3.5 to 1)

Examples E 5 to E 7 and Comparison Example CE 10

Table 4 shows the storage stability when mixed with a detergent. Commercially available, non-coated sodium percarbonate from the applicant (CE 10), which had been prepared by reacting soda and hydrogen peroxide in the aqueous phase, crystallizing the NaPc, separating it from the aqueous phase and drying, was used.

Coating was performed each time with magnesium sulfate (5 wt. %), sodium carbonate (5 wt. %) and sodium waterglass (2 wt. %, $SiO_2$:$Na_2O$=3.5 to 1), wt. % with reference to the NaPc used. Mono-layered coating (E 5) was performed by simultaneous use of a $MgSO_4$ solution and an aqueous solution containing $Na_2CO_3$ and sodium waterglass, which were sprayed onto the NaPc by means of a three-component nozzle. In the case of two-layered coating (E 6), the solutions mentioned were used one after the other by means of a two-component nozzle. In the case of three-layered coating (E 7), the $MgSO_4$ solution, a $Na_2CO_3$ solution and lastly a sodium waterglass solution were sprayed on one after the other.

Two and three-layered coating produced an essentially better stabilizing effect than mono-layered coating.

TABLE 4

Storage stability of commercially available NaPc (prepared by crystallisation) without coating and with mono/two/three-layered coating in a fluidised bed, according to the invention

| | CE or E No. | $O_a$ retention (%) after no. of weeks | | |
|---|---|---|---|---|
| | | 2 | 4 | 8 |
| NaPc not coated (starting product for E 5 to E 7) Coating | CE 10 | 85 | 75 | 59 |
| mono-layered* | E 5 | 93 | 86 | 75 |
| two-layered** | E 6 | 98 | 97 | 95 |
| three-layered*** | E 7 | 96 | 95 | 93 |

*Total amount of coating each time, calculated hydrate-free, was 12 wt. %, with reference to NaPc, consisting of 5% $MgSO_4$, 5% $Na_2CO_3$ and 2% NaWgl
**The internal layer consisted of $MgSO_4$ or hydrates of the same and the external layer of $Na_2CO_3$ and sodium silicates or hydrates of the substances mentioned
***The internal layer consisted of $MgSO_4$ or hydrates of the same, the second layer of $Na_2CO_3$ or hydrates of the same and the external layer of sodium silicates

Examples E 8 and E 9, Comparison Example CE 11

A sodium percarbonate (CE 11) was used which had been prepared by spray granulation in a fluidized bed, in the same way as in the process in DE 27 33 935. 10% of the particles had a particle diameter between 0.2 and 0.5 mm, 70% had a diameter between 0.5 and 0.7 mm and 20% had a diameter between 0.7 and 1.0 mm.

This was coated according to the invention in a fluidized bed, into which was sprayed first a $MgSO_4$ solution and then a solution of $Na_2CO_3$ and sodium waterglass ($SiO_2:Na_2O$ =3.5 to 1). The temperature of the spray solutions was 40° C. The temperature of the fluidized bed during spraying was 50 to 60° C. The temperature of the fluidized bed during after drying was 80° C.

The examples verify the extraordinary increase in storage stability of coated sodium percarbonate particles according to the invention.

TABLE 5

Storage stability of NaPc, prepared by spray granulation in a fluidised bed with and without coating, when mixed with detergents

| | CE or E No. | $O_a$ retention (%) after no. of weeks | | |
|---|---|---|---|---|
| | | 2 | 4 | 8 |
| NaPc not coated NaPc coated with: | CE 11 | 89 | 79 | 65 |
| 5.0% $MgSO_4$ 5.0% $Na_2CO_3$ 2.0% NaWgl | E 8* | 100 | 100 | 97 |

TABLE 5-continued

Storage stability of NaPc, prepared by spray granulation in a fluidised bed with and without coating, when mixed with detergents

| | CE or E No. | $O_a$ retention (%) after no. of weeks | | |
|---|---|---|---|---|
| | | 2 | 4 | 8 |
| 2.5% $MgSO_4$ 2.5% $Na_2CO_3$ 1.0% NaWgl | E 9* | 10 | 99 | 93 |

*Two-layered coating, wherein the inner layer consists of $MgSO_4$ or hydrates of the same and the external layer of $Na_2CO_3$ and sodium silicates or hydrates of the substances mentioned

We claim:

1. A coated sodium percarbonate particle comprising a core of sodium percarbonate and a coating which contains sodium carbonate and at least one magnesium compound, which coating constitutes 0.5 to 25 wt. %, calculated hydrate-free, of said core of sodium percarbonate, said at least one magnesium compound being a member selected from the group consisting of a salt of hydrochloric acid, a salt of carboxylic acids with 1 to 4 carbon atoms and the reaction products of the said salt with sodium carbonate, wherein said coating may contain components that are partially hydrated and wherein said sodium carbonate and at least one magnesium compound are located in a single layer or in a plurality of layers of the coating.

2. The coated sodium percarbonate particle according to claim 1, wherein the coating comprises at least one layer of essentially sodium carbonate and/or hydrate thereof and at least one layer of at least one magnesium compound.

3. The coated sodium percarbonate particle according to claim 1, wherein the coating also contains a layer of one or more alkali metal silicates and/or hydrate thereof, or an alkali metal silicate is present in one or more layer which contains sodium carbonate and/or at least one magnesium compound.

4. The coated sodium percarbonate particle according to claim 1 wherein the coating additionally contains one layer containing essentially sodium carbonate and one layer containing essentially sodium silicates, wherein one or more thereof may be present in the form of its hydrate.

5. The coated sodium percarbonate particle according to claim 4 wherein the sequence of layers is from inside to outside.

6. The coated sodium percarbonate particle according to claim 1 wherein the coating constitutes 1 to 15 wt. %, with reference to the sodium percarbonate, and the coated particle contains in the coating layer(s), essentially sodium carbonate and/or hydrate thereof in an amount of 0.2 to 10 wt. %, calculated as $Na_2CO_3$, at least one magnesium compound, and/or hydrate thereof, in an amount of 0.2 to 10 wt. %, and sodium silicates or its hydrate with a molar ratio of $SiO_2$ to $Na_2O$ of 4:1 to 1:1, in an amount of 0 to 5 wt. %, calculated hydrate-free, each being with reference to the sodium percarbonate, as stabilizing coating components.

7. A detergent, cleansing agent or bleaching composition containing the coated sodium percarbonate particles of claim 1 as a bleaching component.

8. A coated sodium percarbonate particle comprising a core of sodium percarbonate and a coating which contains sodium carbonate and at least one magnesium compound, which coating constitutes 0.5 to 25 wt. %, calculated hydrate-free, of said core of sodium percarbonate, said at least one magnesium compound being a member selected from the group consisting of a salt of hydrochloric acid, a salt of carboxylic acids with 1 to 4 carbon atoms and the reaction products of the said salt with sodium carbonate, wherein said coating may contain components that are partially hydrated and wherein said sodium carbonate and at least one magnesium compound are located in a single layer or in a plurality of layers of the coating, said coated sodium percarbonate particle having been produced by spraying an aqueous solution containing one or more components onto the core to be coated which is located in the fluidized bed, evaporating water while maintaining a fluidized bed temperature of 30 to 100° C., wherein at least solution containing sodium carbonate and at least one aqueous solution containing a magnesium salt selected from the group consisting of magnesium chloride and a magnesium carboxylate of a carbocyclic acid with one to four carbon atoms is sprayed on to the core to be coated, simultaneously or in any sequence one after the other, wherein the total amount of coating components apply is 0.5 to 25 wt. %, calculated hydrate free with reference to the sodium percarbonate.

* * * * *